US009434302B2

(12) United States Patent
Salter et al.

(10) Patent No.: US 9,434,302 B2
(45) Date of Patent: Sep. 6, 2016

(54) PHOTOLUMINESCENT BIN LAMP

(71) Applicant: Ford Global Technologies, LLC, Dearborn, MI (US)

(72) Inventors: Stuart C. Salter, White Lake, MI (US); Cornel Lewis Gardner, Romulus, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 14/477,933

(22) Filed: Sep. 5, 2014

(65) Prior Publication Data
US 2015/0197189 A1 Jul. 16, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
*B60Q 3/02* (2006.01)
*B60R 11/00* (2006.01)

(52) U.S. Cl.
CPC ............ *B60Q 3/022* (2013.01); *B60Q 3/0283* (2013.01); *B60R 11/00* (2013.01); *B60R 2011/0085* (2013.01)

(58) Field of Classification Search
CPC ...... B60Q 3/022; B60Q 3/0283; B60R 11/00
See application file for complete search history.

(56) References Cited

U.S. PATENT DOCUMENTS

| | | | |
|---|---|---|---|
| 5,709,453 A | 1/1998 | Krent et al. | |
| 6,729,738 B2 | 5/2004 | Fuwausa et al. | |
| 6,773,129 B2 | 8/2004 | Anderson, Jr. et al. | |
| 6,851,840 B2 | 2/2005 | Ramamurthy et al. | |
| 6,871,986 B2 | 3/2005 | Yamanaka et al. | |
| 6,945,581 B2 | 9/2005 | Taylor | |
| 6,990,922 B2 | 1/2006 | Ichikawa et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,287,885 B2 | 10/2007 | Radu et al. | |
| 7,422,352 B2 | 9/2008 | Sakakibara | |
| 7,438,452 B2 | 10/2008 | Nawashiro | |
| 7,441,914 B2 | 10/2008 | Palmer et al. | |
| 7,745,818 B2 | 6/2010 | Sofue et al. | |

(Continued)

FOREIGN PATENT DOCUMENTS

CN 201169230 Y 12/2008
CN 101337492 A 1/2009

(Continued)

*Primary Examiner* — David V Bruce
(74) *Attorney, Agent, or Firm* — Vichit Chea; Price Heneveld LLP

(57) ABSTRACT

An illuminated vehicle storage apparatus is disclosed. The storage apparatus comprises a bin rotatably connected to a console and configured to be oriented in an open position and a closed position. The storage apparatus further includes a light source configured to emit a first emission disposed in the console. A photoluminescent portion is disposed proximate the bin such that the first emission is directed toward the photoluminescent portion when the bin is oriented in the open position to illuminate the photoluminescent portion.

20 Claims, 4 Drawing Sheets

(56) References Cited

U.S. PATENT DOCUMENTS

| | | |
|---|---|---|
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2001/0053082 A1 | 12/2001 | Chipalkatti et al. |
| 2002/0159741 A1 | 10/2002 | Graves et al. |
| 2002/0163792 A1 | 11/2002 | Formoso |
| 2003/0002273 A1 | 1/2003 | Anderson, Jr. et al. |
| 2003/0179548 A1 | 9/2003 | Becker et al. |
| 2004/0213088 A1 | 10/2004 | Fuwausa |
| 2006/0054482 A1* | 3/2006 | Radu .................. B60R 13/0243 200/308 |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0230047 A1 | 9/2012 | Smith et al. |
| 2012/0280528 A1 | 11/2012 | Dellock et al. |
| 2013/0335994 A1 | 12/2013 | Mulder et al. |
| 2014/0264079 A1* | 9/2014 | Tarahomi ............. B60Q 3/0283 250/459.1 |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

* cited by examiner

PHOTOLUMINESCENT BIN LAMP

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entiled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to a lighting apparatus for a vehicle bin employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illuminated vehicle storage apparatus is disclosed. The storage apparatus comprises a bin rotatably connected to a console and configured to be oriented in an open position and a closed position. The storage apparatus further includes a light source configured to emit a first emission disposed in the console. A photoluminescent portion is disposed proximate the bin such that the first emission is directed toward the photoluminescent portion when the bin is oriented in the open position to illuminate the photoluminescent portion.

According to another aspect of the present invention, an overhead console storage apparatus is disclosed. The storage apparatus comprises a bin connected to the overhead console and configured to be oriented in an open position and a closed position. A first photoluminescent portion is disposed in the console and configured to illuminate a storage tray of the bin in the open position. A second photoluminescent portion is further disposed on the bin and configured to illuminate in the closed position.

According to yet another aspect of the present invention, an illuminated vehicle console and storage bin is disclosed. The vehicle console comprises a first photoluminescent portion configured to illuminate an interior portion of the storage bin when the bin is oriented in an open position. The storage bin comprises a second photoluminescent portion configured to illuminate an exterior portion of the storage bin when the storage bin is oriented in a closed position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Many modern automotive vehicles include a variety of storage compartments and bins distributed throughout the passenger compartment of the vehicle. Storage compartments may include a variety of bins, containers, glove boxes, sunglass bins, etc. Many storage bins are configured such that an occupant of a vehicle can open and close the storage bin to secure items and belongings. The disclosure provides for a lighting apparatus configured to illuminate an interior cavity of a storage bin.

In some implementations, the disclosure may further provide a lighting apparatus configured to illuminate a vehicle badge, emblem, and/or logo. The term emblem as discussed herein may refer to a component of a vehicle configured to suggest a logo and/or branding of a group, company, and/or entity. The emblem may include or be formed to communicate shapes, forms, lettering, and various designs that may be functional and/or decorative. For example, an emblem may be configured to function as a portion of a bin or storage compartment and also correspond to a shape or form that may have some affiliation to a group, company, and/or entity.

Figure 1A:
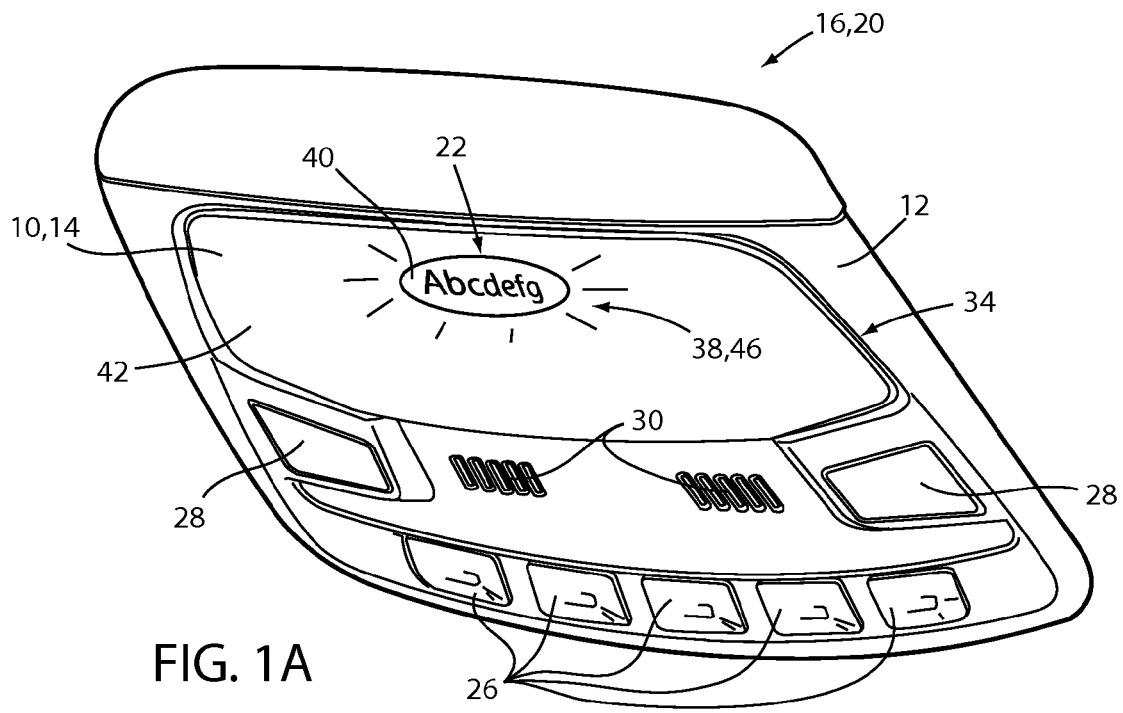
FIG. 1A is a perspective view of a lighting apparatus for a vehicle bin shown in a closed position.
Figure 1B:
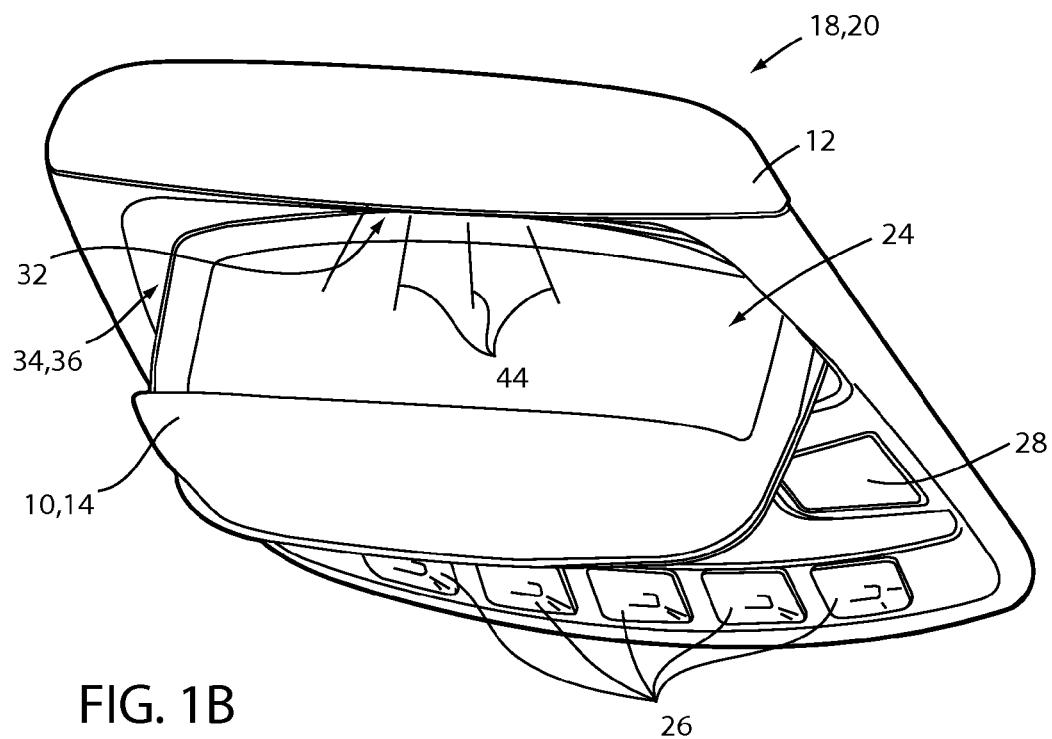
FIG. 1B is a perspective view of a lighting apparatus for a vehicle bin shown in an open position.

Referring to FIGS. 1A and 1B, a perspective view of a storage bin 10 for a vehicle is shown disposed in a console 12. The storage bin 10 in this particular example may correspond to a sunglass bin 14. FIGS. 1A and 1B demonstrate the sunglass bin 14 in a closed position 16 and an open position 18, respectively. The console 12 may correspond to an overhead console 20 disposed in an interior roof portion (e.g. a headliner) of a vehicle. The overhead console 20 may further comprise a lighting apparatus 22 configured to illuminate an interior cavity 24 of the storage bin 10. Additional accessories may also be disposed in the overhead console 20, for example a plurality of user inputs 26, reading lights 28, a hands-free microphone 30, etc.

The lighting apparatus 22 may incorporate a light source 32 disposed inside a console cavity 34 formed by the overhead console 20. The console cavity 34 may be configured to engage the storage bin 10 and allow the storage bin 10 to be selectively positioned in the closed position 16 and the open position 18. The light source 32 may be configured to output a first emission of light having a first wavelength. The first emission may be directed toward a first photoluminescent portion 36 in the open position 18 and a second photoluminescent portion 38 in the closed position 16. In this way, the lighting apparatus 22 may be configured to illuminate the interior cavity 24 and/or a badge 40 disposed on an exterior surface 42 of the storage bin 10. A detailed description of the light source 32 and the first emission are discussed in reference to FIGS. 3-5B.

In response to receiving the first emission, in the open position 18, the first photoluminescent portion 36, disposed in the console cavity 34, may be configured to convert the first emission having the first wavelength to a second emission 44 having a second wavelength. The second wavelength may be longer than the first wavelength such that the second wavelength corresponds to a different color of light than the first wavelength. The second wavelength may also be configured such that the corresponding light has an increased visual acuity relative to the first wavelength in the visible color spectrum of light. In this configuration, the second emission 44 is configured to illuminate the interior cavity 24 of the storage bin 10 such that the contents may be readily visible to an occupant of the vehicle.

In response to receiving the first emission, in the closed position 16, the second photoluminescent portion 38, may be configured to convert the first emission having the first wavelength to a third emission 46 having a third wavelength. Similar to the second wavelength, the third wavelength may also be longer than the first wavelength. The third wavelength may be similar in color to the second wavelength, and in some implementations, may correspond to a different color of light than the second wavelength. The various implementations described herein provide for various configurations of a lighting apparatus configured to illuminate at least a portion of a storage bin. In some implementations, the lighting apparatus may provide for utility lighting and/or ambient lighting to enhance an appearance and utility of a storage bin for an automotive vehicle.

Various systems and devices may be utilized to automatically or manually activate and/or adjust the light emitted as the first emission from the light source 32. An intensity or illumination level of the light source 32 may be adjusted in response to an ambient light condition, presence detection, or any form of sensory interface. The light source 32 may also be illuminated selectively in various vehicle states, for example the light source 32 may be activated in response to an ignition event, a locking or unlocking actuation etc. In some implementations, the light source 32 may also be configured to illuminate in response to a presence or proximity detection of a vehicle key or key fob, and/or a signal from a remote keyless entry device.

The various implementations of the lighting apparatus 22 may provide for ambient lighting of the vehicle badge 40 and/or the interior cavity 24 of the storage bin 10. The light generated by the first photoluminescent portion 36 and the second photoluminescent portion 38 may be configured to emit wavelengths of light corresponding to a wide range of colors of light emitted from the badge 40 and/or the interior cavity 24 of the storage bin 10. The various embodiments disclosed herein provide a novel approach for providing ambient light for a storage bin of a vehicle.

Figure 2A:
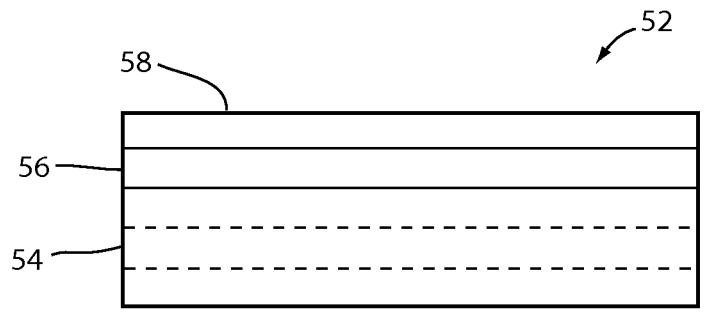
FIG. 2A illustrates a photoluminescent structure rendered as a coating.
Figure 2B:
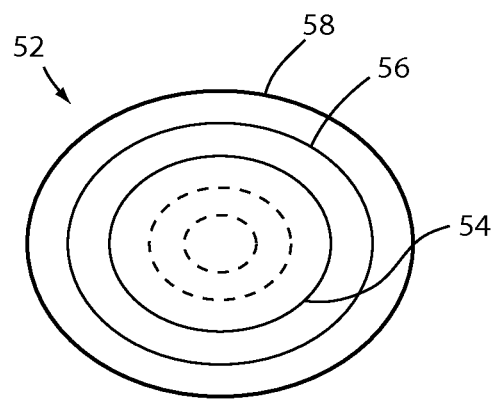
FIG. 2B illustrates the photoluminescent structure rendered as a discrete particle.
Figure 2C:
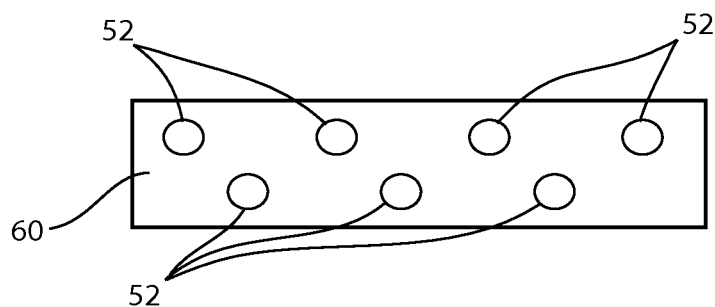
FIG. 2C illustrates a plurality photoluminescent structures rendered as discrete particles and incorporated into a separate structure.

Referring to FIGS. 2A-2C, a photoluminescent structure 52 is generally shown rendered as a coating (e.g. a film) capable of being applied to a vehicle fixture or surface, a discrete particle capable of being implanted in a vehicle fixture, and a plurality of discrete particles incorporated into a separate structure capable of being applied to a vehicle fixture, respectively. The photoluminescent structure 52 may correspond to the first photoluminescent portion 36 and the second photoluminescent portion 38 as discussed herein. At the most basic level, the photoluminescent structure 52 includes an energy conversion layer 54 that may be provided as a single layer or a multilayer structure, as shown through broken lines in FIGS. 2A and 2B.

The energy conversion layer 54 may include one or more photoluminescent materials having energy converting elements selected from a phosphorescent and/or a fluorescent material. The photoluminescent material may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as a Stokes shift and serves as the principle driving mechanism for an energy conversion process corresponding to a change in wavelength of light, often referred to as down conversion. In the various implementations discussed herein, at least one of the wavelengths of light (e.g. the first wavelength, etc.) correspond to electromagnetic radiation utilized in the conversion process.

Each of the photoluminescent portions may comprise at least one photoluminescent structure 52 comprising an energy conversion layer (e.g. energy conversion layer 54). The energy conversion layer 54 may be prepared by dispersing the photoluminescent material in a polymer matrix 60 to form a homogenous mixture using a variety of methods as shown in FIG. 2C. Such methods may include preparing the energy conversion layer 54 from a formulation in a liquid carrier medium and coating the energy conversion layer 54 to a desired planar and/or non-planar substrate of a vehicle fixture or surface. The energy conversion layer 54 coating may be deposited on a vehicle fixture or surface by painting, screen printing, spraying, slot coating, dip coating, roller coating, and bar coating. Additionally, the energy conversion layer 54 may be prepared by methods that do not utilize a liquid carrier medium.

For example, a solid state solution (homogenous mixture in a dry state) of one or more photoluminescent materials may be incorporated in a polymer matrix 60 to provide the energy conversion layer 54. The polymer matrix 60 may be formed by extrusion, injection molding, compression molding, calendaring, thermoforming, etc. In instances where one or more energy conversion layers 54 are rendered as particles, the single or multi-layered energy conversion layers 54 may be implanted into a vehicle fixture or panel. When the energy conversion layer 54 includes a multilayer formulation, each layer may be sequentially coated. Additionally, the layers can be separately prepared and later laminated or embossed together to form an integral layer. The layers may also be coextruded to prepare an integrated multi-layered energy conversion structure. For clarity, the polymer matrix 60 comprising photoluminescent material may be referred to as the energy conversion layer 54 hereinafter to demonstrate that each may be similarly utilized to convert the first wavelength of light to at least a second wavelength.

Referring back to FIGS. 2A and 2B, the photoluminescent structure 52 may optionally include at least one stability layer 56 to protect the photoluminescent material contained within the energy conversion layer 54 from photolytic and thermal degradation. The stability layer 56 may be configured as a separate layer optically coupled and adhered to the energy conversion layer 54. The stability layer 56 may also be integrated with the energy conversion layer 54. The photoluminescent structure 52 may also optionally include a protective layer 58 optically coupled and adhered to the stability layer 56 or any layer or coating to protect the photoluminescent structure 52 from physical and chemical damage arising from environmental exposure.

The stability layer 56 and/or the protective layer 58 may be combined with the energy conversion layer 54 to form an integrated photoluminescent structure 52 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 52. Once formed, the photoluminescent structure 52 may be applied to a chosen vehicle fixture or surface.

In some implementations, the photoluminescent structure 52 may be incorporated into a vehicle fixture as one or more discrete multi-layered particles as shown in FIG. 2C. The photoluminescent structure 52 may also be provided as one or more discrete multi-layered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
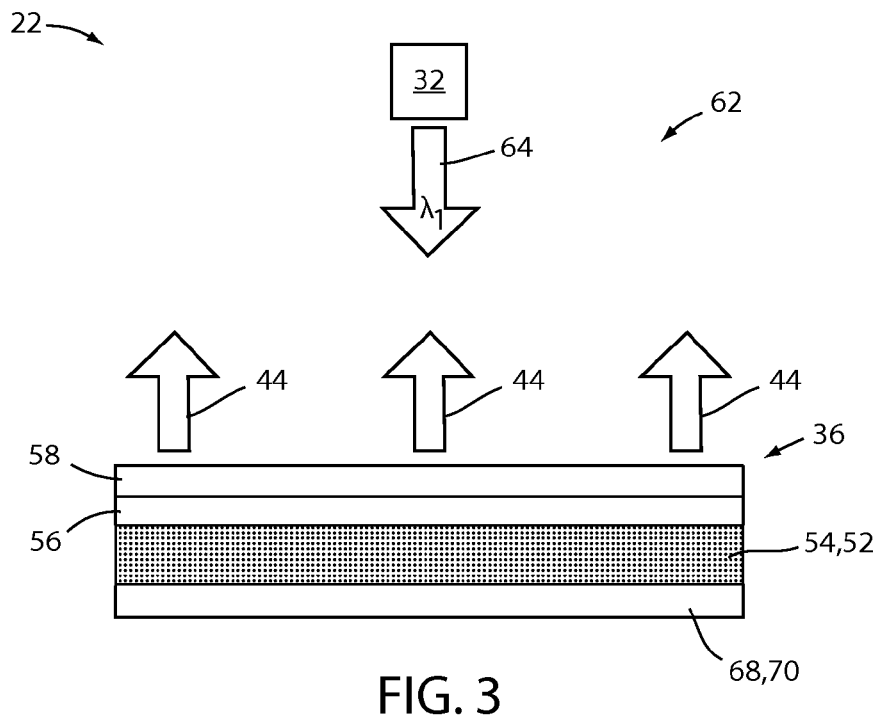
FIG. 3 is schematic view of front-lit configuration of a lighting apparatus configured to convert a first wavelength of light to at least a second wavelength.

Referring to FIG. 3, the lighting apparatus 22 is generally shown according to a front-lit configuration 62. The front-lit configuration 62 may demonstrate an exemplary implementation corresponding to the conversion of a first emission 64 from the light source 32 to the second emission 44 as discussed in reference to FIG. 1B. The second emission 44 may correspond to the light emitted from the first photoluminescent portion 36 disposed in the console cavity 34 of the console 12. In this configuration, the light or the first emission 64 emitted from the light source 32 is converted to the second emission 44 by the energy conversion layer 54 of the first photoluminescent portion 36. Though the second emission 44 is discussed in reference to FIG. 1A, the third emission 46 corresponding to the second photoluminescent portion 38 may be comprise a similar photoluminescent structure 52 and energy conversion layer 54 as discussed herein. A further detailed description corresponding to an exemplary implementation of the second photoluminescent portion 38 is discussed in reference to FIG. 4.

The first emission 64 comprises a first wavelength $\lambda_1$, and the second emission 44 comprises at least a second wavelength $\lambda_2$. The lighting apparatus 22 includes the photoluminescent structure 52 which may be rendered as a coating and applied to a substrate 68 of a vehicle fixture 70, for example an interior surface forming at least a portion of the console cavity 34. The photoluminescent material may also be dispersed in the polymer matrix 60 corresponding to the energy conversion layer 54 and utilized to form a portion of the interior surface of the console cavity 34. In some implementations, the energy conversion layer 54 may further include the stability layer 56 and/or the protective layer 58.

In response to the light source 32 being activated, the first emission 64 is received by the energy conversion layer 54 and converted from the first emission 64 having the first wavelength $\lambda_1$ to the second emission 44 having the second wavelength $\lambda_2$. The second emission 44 may comprise a plurality of wavelengths $\lambda_2$, $\lambda_3$, $\lambda_4$ configured to emit any color of light from the first photoluminescent portion 36. By controlling the color of the second emission 44, the interior cavity 24 of the storage bin 10 may be illuminated in a variety of colors to suit an aesthetic appearance of the vehicle.

In various implementations, the lighting apparatus 22 comprises at least one photoluminescent material incorporated in the energy conversion layer 54 and is configured to convert the first emission 64 at the first wavelength $\lambda_1$ to the second emission 44 having at least the second wavelength $\lambda_2$. In order to generate the plurality of wavelengths $\lambda_2$, $\lambda_3$, $\lambda_4$, the energy conversion layer 54 may comprise a red-emitting photoluminescent material, a green-emitting photoluminescent material, and a blue-emitting photoluminescent material dispersed in the energy conversion layer 54. The red, green, and blue-emitting photoluminescent materials may be combined to generate a wide variety of colors of light for the second emission 44. For example, the red, green, and blue-emitting photoluminescent materials may be utilized in a variety of proportions and combinations to control a color of light of the interior cavity 24 of the storage bin 10.

Each of the photoluminescent materials may vary in output intensity, output wavelength, and peak absorption wavelengths based on a particular photochemical structure and combinations of photochemical structures utilized in the energy conversion layer 54. As an example, the second emission 44 may be changed by adjusting the wavelength of the first emission 64 to activate photoluminescent materials in the energy conversion layer 54 at different intensities to alter the color of the second emission 44. In addition to, or alternatively to the red, green, and blue-emitting photoluminescent materials, other photoluminescent materials may be utilized alone and in various combinations to generate the second emission 44 in a wide variety of colors. In this way, the lighting apparatus 22 may be configured for a variety of applications to provide a desired lighting effect for the vehicle.

The light source 32 may also be referred to as an excitation source and is operable to emit at least the first emission 64. The light source 32 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 64. The first emission 64 from the light source 32 may be configured such that the first wavelength $\lambda_1$ corresponds to at least one absorption wavelength of the one or more photoluminescent materials of the energy conversion layer 54. In response to receiving the light at the first wavelength $\lambda_1$, the energy conversion layer 54 may become excited and output the one or more output wavelengths $\lambda_2$, $\lambda_3$, $\lambda_4$ corresponding to the second emission 44. The first emission 64 provides an excitation source for the energy conversion layer 54 by targeting absorption wavelengths of the various photoluminescent materials utilized therein. As such, the lighting apparatus 22 may configured to control the second emission 44 to generate a desired light intensity and color.

In an exemplary implementation, the light source 32 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may comprise wavelengths in an ultraviolet or near ultraviolet color range (~250-450 nm). In an exemplary implementation, the first wavelength $\lambda_1$ may be approximately equal to 470 nm. In general, the first wavelength $\lambda_1$ may be approximately less than 500 nm such that the first emission 64 of the light is not significantly visible relative to the second emission 44 and the third emission 46.

The blue spectral color range and shorter wavelengths may be utilized as an excitation source for the lighting apparatus 22. By utilizing shorter wavelengths for the first wavelength $\lambda_1$, and converting the first wavelength with the conversion layer 54 to at least one longer wavelength, the lighting apparatus 22 creates a visual effect of light originating from the photoluminescent structure 52 of the photoluminescent portions 36 and 38. In this configuration, light is emitted from the photoluminescent structure 52 (e.g. the first photoluminescent portion 36 and the second photoluminescent portion 38) from locations of the vehicle that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material having a wavelength longer than the first wavelength $\lambda_1$ and approximately 430-525 nm. The wavelengths $\lambda_2$, $\lambda_3$, $\lambda_4$ may be utilized to generate a wide variety of colors of light emitted from the first photoluminescent portion 36 and the second photoluminescent portion 38 converted from the first wavelength $\lambda_1$.

Figure 4:
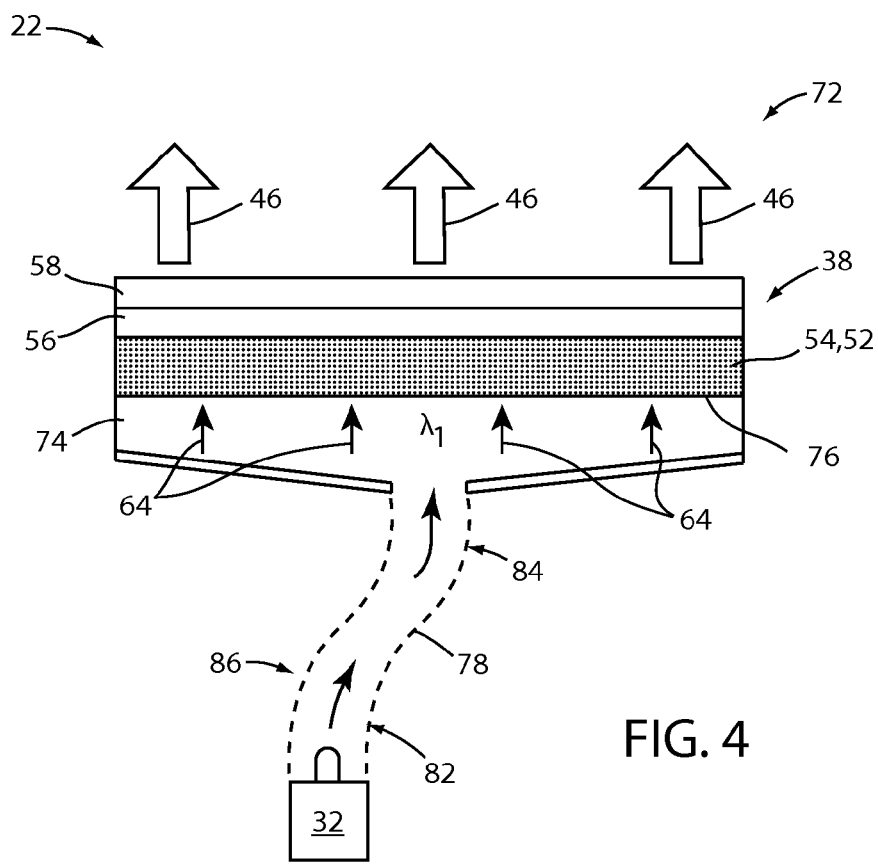
FIG. 4 is schematic view of back-lit configuration of a lighting apparatus configured to convert a first wavelength of light to at least a second wavelength.

Referring to FIG. 4, the lighting apparatus 22 is generally shown according to a back-lit configuration 72 to convert the first emission 64 from the light source 32 to the third emission 46. In this configuration, the lighting apparatus 22 may comprise an optic device 74 configured to direct the light at the first wavelength $\lambda_1$ substantially along the second photoluminescent portion 38. The second photoluminescent portion 38 may comprise the photoluminescent structure 52 in the energy conversion layer 54 disposed as a coating or polymeric matrix disposed on an exterior surface 76 of the optic device 74. In this configuration, the badge 40 may be illuminated by the third emission 46 to provide ambient lighting in a variety of colors.

The optic device 74 may be composed of any material configured to transmit the light at the first wavelength $\lambda_1$ substantially across the extents of the exterior surface 76 abutting the second photoluminescent portion 38. In some implementations, the optic device 74 may comprise a polymeric material configured to provide a refractive index such that the light at the first wavelength is transmitted consistently throughout the exterior surface 76. The second photoluminescent portion 38 and the optic device 74 may form components of the badge 40 and may be configured to illuminate at least a portion of the badge 40.

Similar to the front-lit configuration 62, the back-lit configuration 72 comprises the energy conversion layer 54. The energy conversion layer 54 may be configured to be excited in response to receiving the first wavelength $\lambda_1$ of the first emission 64. In response to the excitation, the third emission 46 may be output as one or more output wavelengths $\lambda_2$, $\lambda_3$, $\lambda_4$. The one or more of wavelengths $\lambda_2$, $\lambda_3$, $\lambda_4$ of the third emission 46 may be configured to emit any color of light from the second photoluminescent portion 38 in response to the excitation of the energy conversion layer 54. The color of the light corresponding to the third emission 46 may be controlled by utilizing a particular ratio of photoluminescent materials as discussed herein.

In some implementations, the back-lit configuration 72 may further comprise a light guide 78 configured to direct the first emission 64 from the light source 32 at the first wavelength $\lambda_1$ to the optic device 74 along a length of the light guide 78. As further demonstrated in FIG. 5A, the light guide 78 may be configured to receive the first emission 64 from the light source when the storage bin is oriented in the closed position 16. The light guide 78 comprises a proximal end portion 82 configured to receive the first emission 64 and a distal end portion 84 configured to emit the first emission 64 into a substantially transparent body of the optic device 74. The light guide 78 may be utilized to transmit the first emission 64 from the light source 32 to the optic device 74 by providing an intermediate light delivery member 86 of the lighting apparatus 22. In this configuration, the light source 32 may remain active throughout use of the storage bin 10, thus limiting the cost the lighting apparatus 22 by avoiding dedicated electronic actuation devices in the light apparatus (e.g. electrical switches).

The light guide 78 may be composed of a material configured to efficiently transmit the first emission 64. In some implementations, the light guide 78 may comprise a light pipe composed of polymeric material. The light guide 78 may comprise a total internal reflective body and may be configured to have a refraction index configured to ensure that the first emission 64 is transmitted efficiently from the proximal end portion 82 to the distal end portion 84. The intermediate light delivery member 86, as described herein may refer to an intermediate body acting as a light source by delivering light supplied from an active light source, for example the light source 32.

Figure 5A:
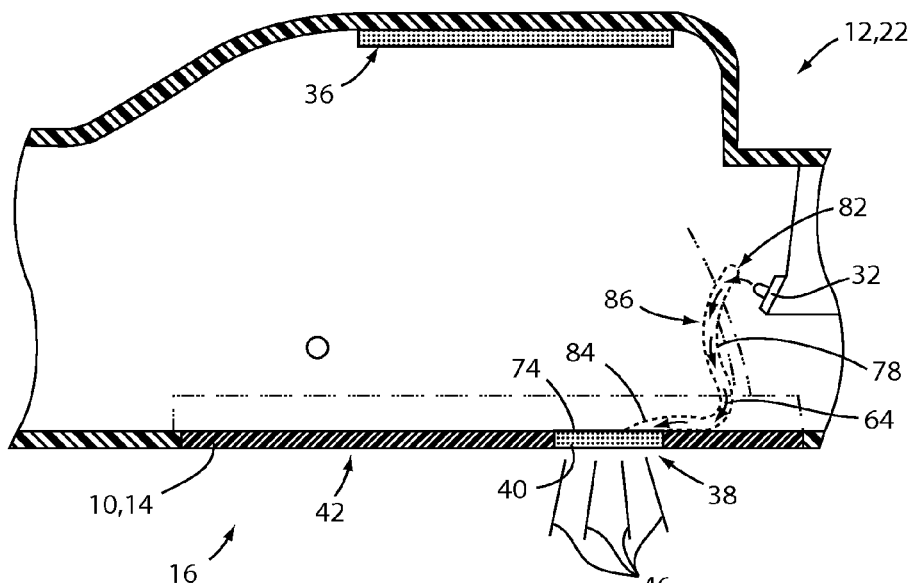
FIG. 5A is a side cross-sectional view of lighting apparatus for a vehicle bin shown in a closed position.
Figure 5B:
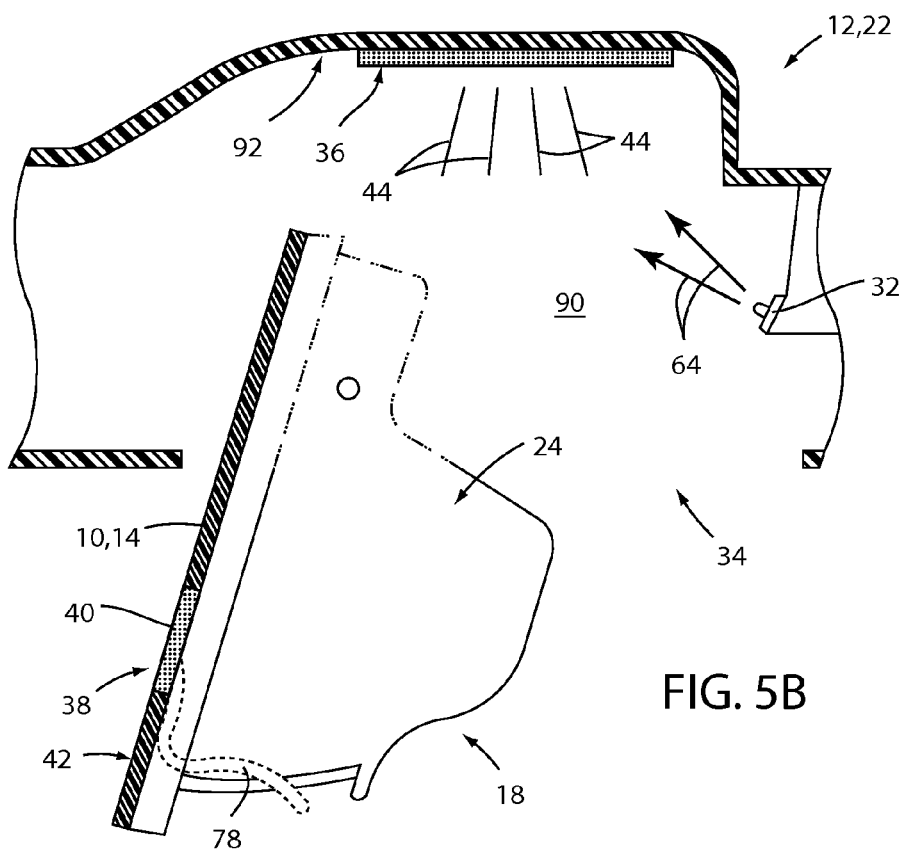
FIG. 5B is a side cross-sectional view of lighting apparatus for a vehicle bin shown in an open position.

Referring to FIGS. 5A and 5B, side cross-sectional views of the console 12 are shown corresponding to the storage bin 10 in the closed position 16 in the open position 18 respectively. In the closed position 16, the first emission 64 is emitted from the light source 32 into the proximal end portion 82 of the light guide 78. The first emission 64 is demonstrated as arrows demonstrating the transmission of the first emission 64 through the light guide 78 and into the second photoluminescent portion 38. As demonstrated in FIG. 4, the first emission 64 is transmitted into the optic device 74 where the first emission 64 is converted to the third emission 46 by the second photoluminescent portion 38 to illuminate the badge 40. The badge 40 is shown disposed proximate the exterior surface 42 of the storage bin 10.

In the open position 18, the first emission 64 is emitted from the light source 32 into the console cavity 34 of the console 12. In this configuration, the first emission 64 is transmitted through a volumetric space 90 toward the first photoluminescent portion 36 which is disposed on an interior surface 92 of the console cavity 34. Upon reaching the first photoluminescent portion 36, the first emission 64 is converted to the second emission 44 by the first photoluminescent portion 36. The second emission 44 may be emitted from the first photoluminescent portion 36 and directed toward the interior cavity 24 of the storage bin 10. In this way, the second emission 44 may illuminate the interior cavity 24 such that any items and your belongings stored therein may be visible to an occupant of the vehicle.

The lighting apparatus 22 described herein may provide for effective and affordable lighting to illuminate an interior portion of a storage bin, and in some cases may further provide for illuminating a badge disposed proximate the storage bin. The lighting apparatus 22 may provide for a dual purpose light source operable to selectively illuminate an interior portion/cavity of a storage bin and a badge disposed proximate the storage bin. The badge may comprise a decorative symbol corresponding to the vehicle. In this way, the lighting apparatus 22 may reduce cost and materials to provide the lighting described herein. Though the apparatus and systems disclosed are described in detail in reference to the sunglass bin 14 and the badge 40, those skilled in the art will acknowledge that the disclosure may be applied to in a variety of implementations without departing from the spirit of the disclosure. Some examples of storage bins may include a vehicle glove box, center console, and a variety of storage bins, compartments, and/or containers for use in vehicles.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue. It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illuminated vehicle storage apparatus comprising:
   a bin rotatably connected to a console and configured to be oriented in an open position and a closed position;
   a light source configured to emit a first emission disposed in the console; and
   a photoluminescent portion disposed proximate the bin, wherein the first emission is directed toward the photoluminescent portion when the bin is oriented in the open position to illuminate the photoluminescent portion.

2. The apparatus according to claim 1, wherein the photoluminescent portion converts the first emission to a second emission having a longer wavelength than the first emission.

3. The apparatus according to claim 1, wherein the console forms a cavity configured to house the bin in the closed position.

4. The apparatus according to claim 3, wherein the photoluminescent portion is disposed in the cavity such that the second emission is directed toward an interior surface of the bin.

5. The apparatus according to claim 4, wherein the first emission is emitted from the light source and passes through a volumetric space of the cavity toward the photoluminescent portion in the open position.

6. The apparatus according to claim 1, further comprising:
   a light guide configured to receive the first emission when the bin is oriented in the closed position.

7. The apparatus according to claim 6, wherein the light guide is configured to transmit the first emission to an exterior surface of the bin to illuminate an additional photoluminescent portion.

8. An overhead console storage apparatus comprising:
   a bin connected to a console and configured to be oriented in an open position and a closed position;
   a first photoluminescent portion disposed in the console and configured to illuminate a storage tray of the bin in the open position; and
   a second photoluminescent portion disposed on the bin and configured to illuminate in the closed position.

9. The apparatus according to claim 8, further comprising a light source configured to emit a first emission having a first wavelength configured to excite the first photoluminescent portion and the second photoluminescent portion.

10. The apparatus according to claim 9, wherein the first emission is directed toward the first photoluminescent portion through a cavity formed by the console when the bin is oriented in the closed position.

11. The apparatus according to claim 10, further comprising an emblem disposed on an outer surface of the bin, the second photoluminescent portion forming a portion of the emblem.

12. The apparatus according to claim 11, further comprising a light guide configured to receive the first emission in the closed position.

13. The apparatus according to claim 12, wherein the first emission is directed through the light guide to the second photoluminescent portion to illuminate the emblem in the closed position.

14. The apparatus according to claim 9, wherein the first wavelength is converted by the first photoluminescent portion and the second photoluminescent portion to at least a second wavelength longer than the first wavelength.

15. The apparatus according to claim 9, wherein the first photoluminescent portion is configured to convert the first emission to a substantially white light to illuminate the storage tray of the bin.

16. An illuminated vehicle console and storage bin comprising:
   a first photoluminescent portion configured to illuminate an interior portion of the bin when the bin is oriented in an open position; and
   a second photoluminescent portion configured to illuminate an exterior portion of the bin when the bin is oriented in a closed position.

17. The console and bin according to claim 16, further comprising a light source configured to emit a first emission at a first wavelength to excite the first photoluminescent portion and the second photoluminescent portion.

18. The console and bin according to claim 17, wherein the first wavelength is approximately less than 500 nm to limit a perceptual acuity of the first emission.

19. The console and bin according to claim 17, further comprising a light pipe configured to receive the first emission in the closed position to transmit the first emission to the second photoluminescent portion.

20. The console and bin according to claim 19, further comprising an emblem, the second photoluminescent portion configured to illuminate a portion of the emblem when the bin is oriented in the closed position.

* * * * *